United States Patent
Tang et al.

(10) Patent No.: US 8,911,822 B2
(45) Date of Patent: Dec. 16, 2014

(54) METHOD OF REPAIRING COLOR FILTER AND PRE-REPAIR MATERIAL USED THEREBY

(75) Inventors: Feng-Chin Tang, Taoyuan County (TW); Chi-Hsin Li, Taipei (TW); Wen-Jen Hsieh, Taoyuan County (TW); Huang-Ming Chen, Hsinchu County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 1021 days.

(21) Appl. No.: 12/547,493

(22) Filed: Aug. 26, 2009

(65) Prior Publication Data
US 2010/0310762 A1    Dec. 9, 2010

(30) Foreign Application Priority Data
Jun. 3, 2009    (TW) .............................. 98118433 A

(51) Int. Cl.
| | | |
|---|---|---|
| *B05D 3/00* | (2006.01) | |
| *B32B 43/00* | (2006.01) | |
| *G02F 1/1335* | (2006.01) | |
| *C08L 79/08* | (2006.01) | |
| *G02B 5/20* | (2006.01) | |
| *C08L 77/00* | (2006.01) | |

(52) U.S. Cl.
CPC .... *G02F 1/133516* (2013.01); *G02F 2201/506* (2013.01); *C08L 79/08* (2013.01); *G02B 5/201* (2013.01); *C08L 77/00* (2013.01)
USPC .......................................................... 427/140

(58) Field of Classification Search
CPC .......... G02F 1/133514; G02F 1/13351; G02F 2201/506
USPC .......................................................... 427/140
See application file for complete search history.

(56) References Cited

U.S. PATENT DOCUMENTS 5,714,195 A * 2/1998 Shiba et al. ................... 427/140
7,183,023 B2 * 2/2007 Sonehara et al. ................. 430/7

FOREIGN PATENT DOCUMENTS

| JP | 2006-350295 | | 12/2006 |
| JP | 2006350122 A | * | 12/2006 |
| TW | 200615586 | | 5/2006 |
| TW | 200820315 | | 5/2008 |

* cited by examiner

*Primary Examiner* — Michael Wieczorek
(74) *Attorney, Agent, or Firm* — Jianq Chyun IP Office

(57) ABSTRACT

A method of repairing a color filter and a pre-repair material used thereby are provided. The method includes the following steps. First, a color filter including a substrate and a color filter layer is provided, and the color filter layer having at least one defect pattern is disposed on the substrate. Then, a pre-repair layer is formed in the at least one defect pattern. After that, a repair layer is formed on the pre-repair layer, and the repair layer is connected to the substrate through the pre-repair layer.

6 Claims, 3 Drawing Sheets

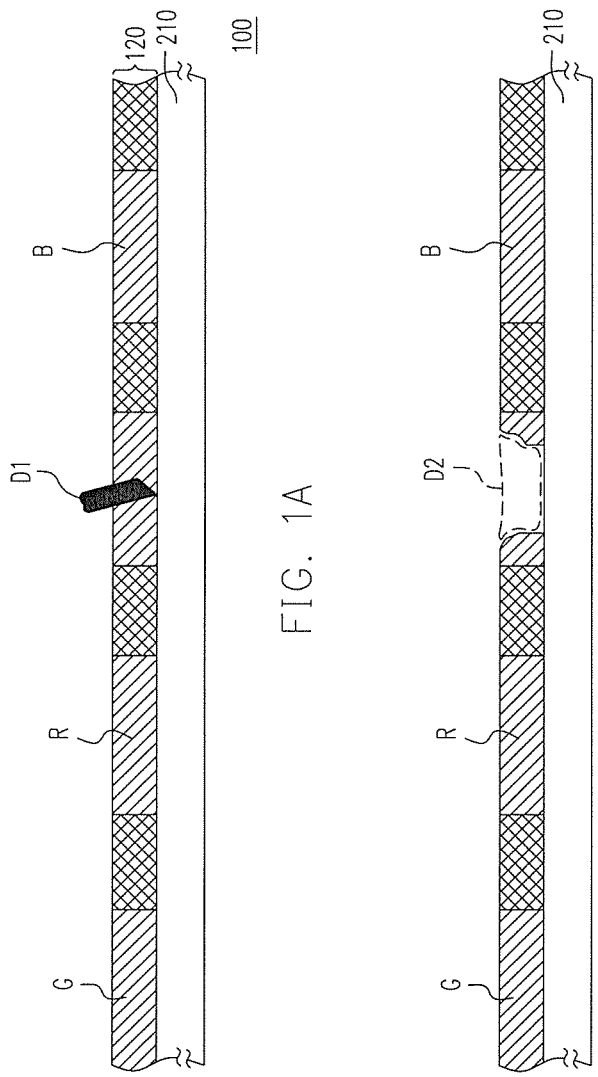

METHOD OF REPAIRING COLOR FILTER AND PRE-REPAIR MATERIAL USED THEREBY

CROSS-REFERENCE TO RELATED APPLICATION

This application claims the priority benefit of Taiwan application serial no. 98118433, filed Jun. 3, 2009. The entirety of the above-mentioned patent application is hereby incorporated by reference herein and made a part of specification.

BACKGROUND OF THE INVENTION

1. Field of the Invention

The present invention generally relates to a repair technique of a filter element and a material used thereby, in particular, to a method of repairing a color filter and a pre-repair material used thereby.

2. Description of Related Art

With the progress in photoelectric and semiconductor technologies, the display panel has been developed rapidly. In order to enable the display panel to display color frames, a color filter is generally disposed therein, so that the light beams passing through a color filter layer in the color filter respectively show corresponding colors, so as to display a color frame.

During the manufacturing process of the color filter, the color filter layer inevitably has some defects, which may degrade the product quality. At this time, it is required to repair the defects and improve the quality of the color filter. Generally, when repairing the color filter, the defects are directly removed by a laser, and then a repair material is formed therein. If a defect is located in a red filter pattern in the color filter layer, a red repair material is used to repair the defect, so as to form a red repair layer in the defect that exposes the substrate.

However, as the repair layer and the substrate have two different material properties, the interface therebetween is likely to have uneven repair and poor attachment. If the situation gets worse, the repair layer may even fall off the substrate, resulting in a decreased quality of the color filter.

SUMMARY OF THE INVENTION

Accordingly, the present invention is directed to a method of repairing a color filter, which is capable of improving the attachment between the repair layer and the substrate, so as to enhance the optical quality of the color filter.

The present invention is also directed to a pre-repair material, which is applied in the method of repairing a color filter, so as to improve the attachment between the repair layer and the substrate.

The present invention is further directed to a pre-repair material, which is applied in the method of repairing a color filter, so as to solve the problem that the color filter is difficult to repair or the repair surface is uneven due to poor leveling property of the repair material on the substrate.

A method of repairing a color filter is provided, which includes the following steps. First, a color filter including a substrate and a color filter layer is provided, and the color filter layer having at least one defect pattern is disposed on the substrate. Then, a pre-repair layer is formed in the at least one defect pattern. After that, a repair layer is formed on the pre-repair layer, and the repair layer is connected to the substrate through the pre-repair layer.

According to an embodiment of the present invention, a thickness of the pre-repair layer is, for example, smaller than 200 nanometer (nm), and a thickness of the repair layer is, for example, in a range of 1.5 micrometer ($\mu$m) to 2 $\mu$m.

According to an embodiment of the present invention, the pre-repair layer is formed in the at least one defect pattern by means of inkjetting or needle dipping.

According to an embodiment of the present invention, the method of repairing a color filter further includes performing a curing process on the pre-repair layer and the repair layer.

According to an embodiment of the present invention, the color filter layer includes a light shielding pattern. In an embodiment, the at least one defect pattern is disposed in the light shielding pattern.

A pre-repair material is provided. Before forming a repair material in at least one defect pattern on a substrate of a color filter, the pre-repair material is suitable to be formed in the at least one defect pattern, such that the repair material is connected to the substrate through the pre-repair material. The pre-repair material includes a solvent and a plurality of structural units dispersed in the solvent. Each structural unit includes a $SiO_2$ group and a $(RCOOC=C)_x$ group, and the $SiO_2$ groups and the $(RCOOC=C)_x$ groups in the structural units react with the substrate and the repair material, respectively.

According to an embodiment of the present invention, the solvent is, for example, petroleum ether, methanol, ethanol, or isopropanol.

According to an embodiment of the present invention, the pre-repair material further includes a monomer, such as, tri (propylene glycol) diacrylate (TPGDA) or methyl methacrylate (MMA).

According to an embodiment of the present invention, the pre-repair material further includes a polymer, such as, poly (vinly alcohol) (PVA), polyamide, or polyimide.

According to an embodiment of the present invention, the pre-repair material further includes a recognition colorant, such as, an organic pigment or an inorganic pigment.

As described above, the method of repairing a color filter of the present invention can solve the problems of poor attachment between the repair layer and the substrate and poor leveling property. According to the method, the $SiO_2$ groups and the $(RCOOC=C)_x$ groups in the pre-repair material respectively react with the substrate and the repair layer in the color filter, such that the repair layer is connected to the substrate through the pre-repair material.

In order to make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 1A and 1B are schematic partial cross-sectional views of two color filters with defects.

DESCRIPTION OF THE EMBODIMENTS

Figures 2A, 2B:
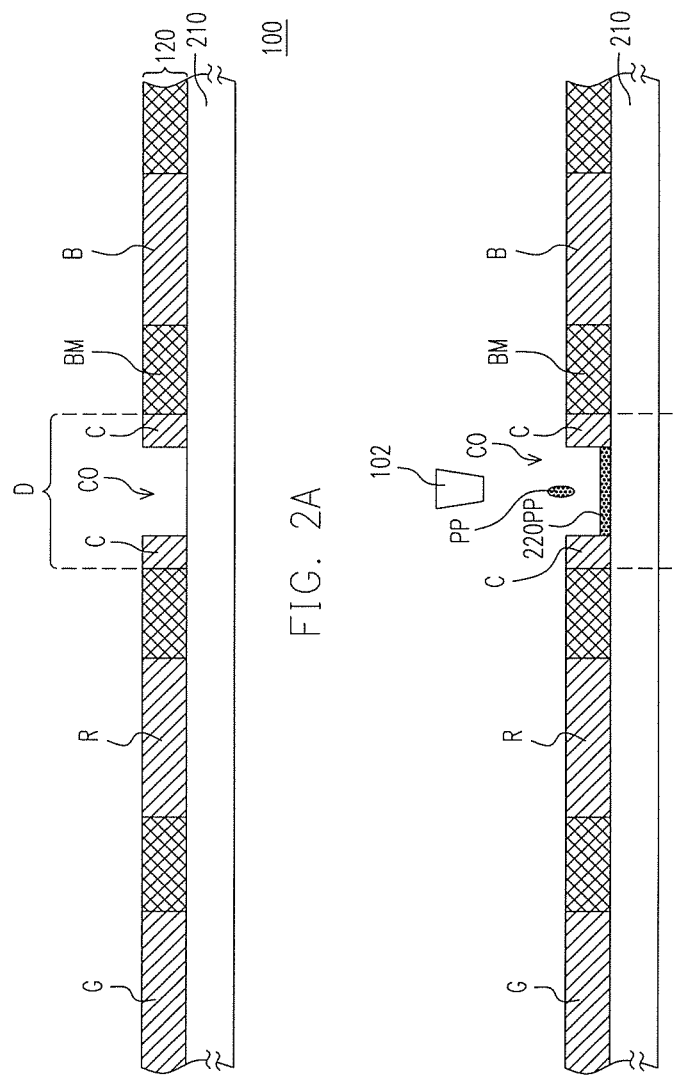
FIGS. 2A to 2C are schematic partial cross-sectional views of a repair flow of a color filter according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

In the actual application of the product, when the color filter has a defect, the defect will generally be repaired. For example, in color filters 100 respectively shown in FIGS. 1A and 1B, the defect may be a micro particle D1, or a color omission area D2 caused by color omission or color irregularity. Moreover, the defect in the color filter may be in other forms, which will not be listed herein.

In practice, a laser process is usually performed to remove the defect from the color filter 100, and then a subsequent repair process is performed. However, the technique of removing the defect by a laser process is not the focus of the present invention and will not be described herein, and the technique that is highlighted in the present invention will be described in detail below.

In the present invention, a method of repairing a color filter and a pre-repair material used thereby are provided for a color filter with a defect.

In this embodiment, before forming a repair material in the defect pattern of the color filter, a pre-repair material is suitable to be formed in the defect pattern, such that the repair material is connected to the substrate through the pre-repair material. However, due to its material property, the pre-repair material provides good attachment on the interface between the pre-repair material and the substrate and on the interface between the pre-repair material and the repair material. As such, after the color filter is repaired, the attachment between the substrate and the repair material is improved by the pre-repair material disposed therebetween.

Next, the spirit of the present invention is further explained by the following examples, but the present invention is not limited to the embodiments described hereinafter.

Figure 2C:
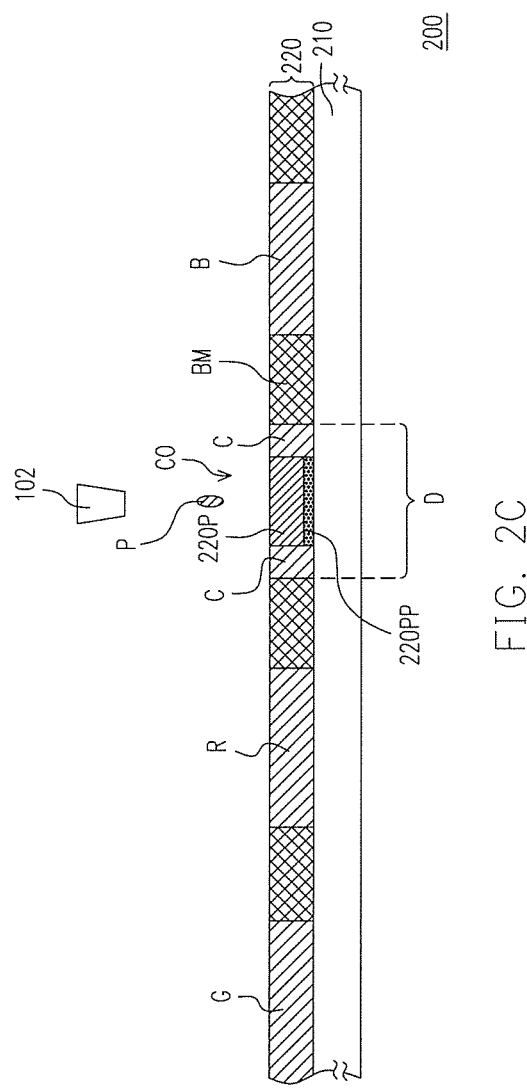

FIGS. 2A to 2C are schematic partial cross-sectional views of a repair process of a color filter according to an embodiment of the present invention. It should be noted that, the color filter 100 in FIG. 2A is obtained after a laser removal process. More specifically, the color filter 100 in FIG. 1A or 1B forms the color filter 100 in FIG. 2A after the laser removal process. However, the color filters 100 in FIGS. 1A and 1B are merely two examples among various color filters with defects, and the present invention is not limited to repairing the color filter 100 in FIG. 1A or 1B.

First, referring to FIG. 2A, a color filter 100 is provided. In this embodiment, the color filter 100 includes a substrate 210 and a color filter layer 120 disposed on the substrate 210.

In this embodiment, the color filter layer 120 is, for example, formed by a plurality of red filter patterns R, a plurality of green filter patterns G, a plurality of blue filter patterns B, a light shielding pattern BM, and at least one defect pattern D, and FIG. 2A merely shows one red filter pattern R, one green filter pattern G, one blue filter pattern B, and one defect pattern D as an example. Definitely, the red, green, blue filter patterns R, G, B are merely used to exemplify the color filter layer 120 of this embodiment, instead of limiting the color of the color filter pattern in the present invention.

In this embodiment, the defect pattern D is, for example, formed by a color pattern C and a color omission pattern CO. The color pattern C in FIG. 2A is, for example, a defect green filter pattern, and the color omission pattern CO, for example, exposes the substrate 210. In other embodiments, the color pattern C may also be a defect red or blue filter pattern or a defect light shielding pattern. However, the defect pattern D may also be merely formed by a color omission pattern CO, and the defect pattern D can be located at a position for disposing the color filter pattern (for example, the red, green, or blue filter pattern R, G, B) or the light shielding pattern BM.

Next, referring to FIG. 2B, a pre-repair layer 220PP is formed in the defect pattern D. In this embodiment, for example, the pre-repair layer 220PP having a thickness substantially smaller than 200 nanometer (nm) is formed by an inkjetting process, in which a pre-repair material PP is injected onto the substrate 210 to form the pre-repair layer 220PP through an injection nozzle 102.

However, the present invention does not limit the inkjetting process as the only method of forming the pre-repair layer 220PP, and in other embodiments, the pre-repair material PP may also be coated on the substrate 210 through a needle coating process, that is, a repair method through needle dipping. Definitely, this step may be performed by other methods that are capable of providing the pre-repair material PP on the substrate 210. In practice, the machine used for forming the pre-repair layer 220PP in this step can be the same as that used for forming a repair layer 220P in the subsequent step, which not only simplifies the process, but also reduces the cost for buying an additional machine. Definitely, the present invention does not limit that the machine used for forming the pre-repair layer 220PP must be the same as that used for forming the repair layer 220P, for example, it is feasible that the substrate 210 is taken out of a machine for forming the pre-repair layer 220PP, and then put in another machine for forming the repair layer 220P. In brief, in the actual application, the method of forming the pre-repair layer 220PP in the present invention can be performed in accordance with various types of repair machines.

In this embodiment, the pre-repair material PP includes a solvent and a plurality of structural units dispersed in the solvent. The solvent may be a material having a low boiling point, such as, petroleum ether, methanol, ethanol, or isopropanol. Each structural unit includes a $SiO_2$ group and a $(RCOOC=C)_x$ group, i.e., $SiO_2(RCOOC=C)_x$. It should be noted that, the $SiO_2$ group in each structural unit reacts with the substrate 210, such that the pre-repair layer 220PP on the substrate 210 achieves good leveling property, thus providing good attachment between the pre-repair layer 220PP and the substrate 210.

In practice, the pre-repair material PP may further include a plurality of additives, for example, a monomer for diluting the pre-repair material, a polymer for adjusting hydrophilicity or hydrophobicity, or a recognition colorant easy to be observed by the human eye. The monomer may be tri(propylene glycol) diacrylate (TPGDA) or methyl methacrylate (MMA), the polymer may be poly(vinly alcohol) (PVA), polyamide, or polyimide, and the recognition colorant may be a light-colored material such as an organic pigment or an inorganic pigment that exerts no impact on the color of the color filter pattern (for example, the red, green, or blue filter pattern R, G, B) or the light shielding pattern BM.

Thereafter, referring to FIG. 2C, a repair layer 220P is formed on the pre-repair layer 220PP. In this embodiment, for example, the repair layer 220P having a thickness substantially in a range of 1.5 μm to 2 μm is formed by the same method of forming the pre-repair layer 220PP, that is, the repair material P is injected onto the substrate 210 to form the repair layer 220P through the injection nozzle 102 used in the inkjetting process. Generally, the composition of the repair material P includes a photoresist. In this embodiment, before forming the repair layer 220P, the pre-repair layer 220PP having a $(RCOOC=C)_x$ group has already been formed on the substrate 210, and thus the photoresist in the repair material P reacts with the $(RCOOC=C)_x$ group, so that the repair layer 220P on the pre-repair layer 220PP achieves good leveling property, thereby providing good attachment between the repair layer 220P and the pre-repair layer 220PP.

Further, in this embodiment, a repair material P in a corresponding color is selected according to the color of the color pattern C in this step. For example, when the color pattern C is green, a green repair material P is selected to form a green repair layer 220P, and the repair of the color pattern C in other colors can be known by analogy.

In other embodiments, the above step can be performed through a needle dipping process or other methods suitable for providing the repair material P on the substrate 210. As far as the process is concerned, when the method of forming the repair layer 220P in this step is the same as that of forming the pre-repair layer 220PP in the previous step, the process can be simplified. Definitely, the present invention does not limit the method of forming the repair layer 220P, and the method of forming the repair layer 220P of the present invention can be performed in accordance with various types of repair machines.

Till now, the method of repairing the color filter 100 of the present invention is almost completed, in which a very thin pre-repair layer 220PP is disposed between the substrate 210 and the repair layer 220P in the repaired color filter 200. In practice, after carrying out the above steps, a curing process may be further performed on the pre-repair layer 220PP and the repair layer 220P to cure the pre-repair layer 220PP and the repair layer 220P.

It can be known from the above that, as the $SiO_2$ groups and the $(RCOOC=C)_x$ groups in the pre-repair layer 220PP respectively react with the substrate 210 and the repair layer 220P after contact, the attachment between the interfaces is significantly improved. As such, the repair layer 220P is connected to the substrate 210 through the pre-repair layer 220PP, thereby eliminating the poor attachment between the repair layer and the substrate in the conventional color filter.

In view of the above, by applying the pre-repair material in the method of repairing a color filter of the present invention, the attachment between the repair layer and the substrate as well as the leveling property thereof can be significantly improved, so as to solve the problem that the color filter is difficult to repair or the repair surface is uneven. Further, the $SiO_2$ groups and the $(RCOOC=C)_x$ groups in the pre-repair material respectively react with the substrate and the repair layer in the color filter, such that the repair layer is connected to the substrate through the pre-repair material. In addition, the present invention is not limited by the characteristics of different repair machines, and thus capable of meeting the requirements of various repair machines. Thereby, different types of machines can be integrated or simplified, so as to simplify the repair process and reduce the cost for buying new ones.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents

What is claimed is:

1. A method of repairing a color filter, comprising:
   providing a color filter, wherein the color filter comprises a substrate and a color filter layer thereon, and the color filter layer has at least one defect pattern;
   forming a pre-repair layer in the at least one defect pattern, wherein the pre-repair layer has a $SiO_2$ group and an ethenyl acetate group, and the $SiO_2$ group reacts with the substrate; and
   forming a repair layer on the pre-repair layer, wherein the repair layer reacts with the ethenyl acetate group,
   wherein the repair layer is connected to the substrate through the pre-repair layer.

2. The method of repairing a color filter according to claim 1, wherein a thickness of the pre-repair layer is smaller than 200 nm, and a thickness of the repair layer is in a range of 1.5 µm to 2 µm.

3. The method of repairing a color filter according to claim 1, wherein the pre-repair layer is formed in the at least one defect pattern by means of inkjetting or needle dipping.

4. The method of repairing a color filter according to claim 1, further comprising:
   performing a curing process on the pre-repair layer and the repair layer.

5. The method of repairing a color filter according to claim 1, wherein the color filter layer comprises a light shielding pattern.

6. The method of repairing a color filter according to claim 5, wherein the at least one defect pattern is disposed in the light shielding pattern.

* * * * *